(12) United States Patent
Borean et al.

(10) Patent No.: US 8,857,406 B2
(45) Date of Patent: Oct. 14, 2014

(54) INTERNAL COMBUSTION ENGINE, WITH GASOLINE DIRECT INJECTION, HAVING A SYSTEM FOR VARIABLE ACTUATION OF THE INTAKE VALVES

(75) Inventors: Fabio Borean, Orbassano (IT); Andrea Stroppiana, Orbassano (IT); Sabino Luisi, Orbassano (IL)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 415 days.

(21) Appl. No.: 13/305,367

(22) Filed: Nov. 28, 2011

(65) Prior Publication Data

US 2012/0210975 A1    Aug. 23, 2012

(30) Foreign Application Priority Data

Feb. 18, 2011   (EP) .................................. 111154952

(51) Int. Cl.
| | |
|---|---|
| *F02D 41/26* | (2006.01) |
| *F01L 9/02* | (2006.01) |
| *F02D 41/38* | (2006.01) |
| *F02D 41/40* | (2006.01) |
| *F02D 13/02* | (2006.01) |
| *F02B 23/10* | (2006.01) |
| *F02D 41/00* | (2006.01) |

(52) U.S. Cl.
CPC ................. *F02D 41/40* (2013.01); *F01L 9/025* (2013.01); *F02B 23/104* (2013.01); *Y02T 10/142* (2013.01); *F02D 41/3845* (2013.01); *F02D 2041/001* (2013.01); *Y02T 10/42* (2013.01); *Y02T 10/44* (2013.01); *F02D 41/0002* (2013.01); *F01L 9/023* (2013.01); *Y02T 10/18* (2013.01); *F02D 41/3318* (2013.01); *F02D 13/023* (2013.01); *F02D 13/0269* (2013.01)
USPC ............................ 123/299; 123/478; 701/104

(58) Field of Classification Search
USPC ................. 123/294, 295, 304, 305, 478, 490; 701/103–105
See application file for complete search history.

(56) References Cited

U.S. PATENT DOCUMENTS 5,277,165 A * 1/1994 Matsuo .......................... 123/492
5,720,253 A * 2/1998 Matoba et al. ................. 123/298

(Continued)

FOREIGN PATENT DOCUMENTS

| DE | 102008022590 B3 | 11/2009 |
|---|---|---|
| EP | 0803642 A1 | 10/1997 |

(Continued)

OTHER PUBLICATIONS

European Search Report for corresponding European Application No. 11154952.3, dated Aug. 31, 2011.

*Primary Examiner* — John Kwon
*Assistant Examiner* — Johnny H Hoang
(74) *Attorney, Agent, or Firm* — Heslin Rothenberg Farley & Mesiti PC; Victor A. Cardona, Esq.

(57) ABSTRACT

An electronic control means of an engine controls a system for the variable actuation of intake valves and for controlling gasoline injection into the combustion chamber. To the electronic control means there are associated memory means. The electronic means are programmed for detecting a value of a crank angle at which the intake valve is closed, controlling the end of the injection with an anticipation with respect to the closing of the intake valve controlling the start of the injection substantially according to said crank angle limit value, and regulating the injection pressure to a value which is defined as a function of the injection time to guarantee the injection of a predefined amount of gasoline.

3 Claims, 6 Drawing Sheets

(56) References Cited

U.S. PATENT DOCUMENTS

| | | | |
|---|---|---|---|
| 6,092,496 A * | 7/2000 | Bhargava et al. | 123/90.15 |
| 6,334,428 B1 | 1/2002 | Nagatani et al. | |
| 6,575,127 B2 * | 6/2003 | Kobayashi | 123/90.15 |
| 6,857,418 B2 * | 2/2005 | Corba | 123/478 |
| 6,976,469 B2 * | 12/2005 | Kubo et al. | 123/295 |
| 2006/0021587 A1 * | 2/2006 | Robel et al. | 123/26 |
| 2008/0103678 A1 * | 5/2008 | Teraji et al. | 701/103 |
| 2009/0088945 A1 | 4/2009 | Yi et al. | |
| 2009/0118986 A1 * | 5/2009 | Kita | 701/105 |
| 2009/0234561 A1 | 9/2009 | Marriott et al. | |
| 2010/0030448 A1 * | 2/2010 | Roth et al. | 701/103 |
| 2011/0253113 A1 * | 10/2011 | Roth et al. | 123/568.12 |

FOREIGN PATENT DOCUMENTS

| | | |
|---|---|---|
| EP | 1344900 A2 | 9/2003 |
| EP | 155398 A1 | 7/2005 |
| EP | 1653057 A1 | 5/2006 |

* cited by examiner

INTERNAL COMBUSTION ENGINE, WITH GASOLINE DIRECT INJECTION, HAVING A SYSTEM FOR VARIABLE ACTUATION OF THE INTAKE VALVES

CROSS REFERENCE TO RELATED APPLICATIONS

This application claims priority to European Patent Application No. 11154952.3, filed Feb. 18, 2011, the entire disclosure of which is incorporated herein by reference.

FIELD OF THE INVENTION

The present invention refers to internal combustion engines with gasoline injection, of the type comprising, for each cylinder:

a combustion chamber, at least one intake conduit and at least one exhaust conduit ending up in said combustion chamber, an intake valve and an exhaust valve associated to said intake and exhaust conduits, means for the variable actuation of the intake valve, adapted to vary the closing instant of the intake valve at the end of the intake phase, means for injecting gasoline into said combustion chamber during said intake phase, and adapted to vary the gasoline injection time and pressure, and electronic control means, per controlling said means for actuating the intake valve and said gasoline injection means.

Over the years, the Applicant has developed internal combustion engines comprising a system for the variable actuation of the intake valves of the engine, marketed under the trademark "MULTIAIR". Such engines are of the type in which:

each intake valve is provided with return spring means which push the valve towards a closed position, at least one camshaft for actuating the intake valves and the exhaust valves of the engine cylinders by means of respective tappets is provided for, at least each intake valve is of the variable actuation type, being controlled by the respective tappet, against the action of the abovementioned return spring means, by interposing hydraulic means including a pressurised fluid chamber, which is faced by a pumping piston connected to the tappet of the valve, said pressurised fluid chamber is adapted to be connected by means of a solenoid valve with an exhaust channel with the aim of decoupling the variable actuation valve from the respective tappet and cause the quick closing of the valve due to the respective elastic return means, and electronic control means for controlling each solenoid valve are provided so as to vary the time and the opening travel of the variable actuation valves as a function of one or more engine operating parameters.

The Applicant is the owner of various patents and patent applications regarding engines provided with a system of the type indicated above.

The present invention specifically refers to engines provided with a system for the variable actuation of the intake valves, such as for example the previously indicated "MULTIAIR" system, and prearranged for the direct injection of gasoline into combustion chamber.

The application of the direct injection of gasoline into an engine of the type provided with a system for the variable actuation of the intake valves however reveals some drawbacks that the present inventions intends to overcome.

Obviously, though within the present invention specific reference is made, by way of example, to the previously mentioned "MULTIAIR" system for the variable actuation of the intake valves, the teaching of the invention also applies to an internal combustion engine with gasoline direct injection provided with any other type of system for the variable actuation of the intake valves, which causes a variation, during the operation of the engine, of the closing instant of the intake valves at the end of the intake phase, as a function of the engine operating conditions.

General Problem

The general problem intended to be overcome in case of an engine with gasoline injection having a system for variable actuation of the intake valves consists in obtaining, even when the intake valves are closed in advance with respect to the conventional cycle, both a sufficiently low level of the smoke at the exhaust, i.e. of the particulate emissions and a sufficiently stable combustion during the operation of the engine, i.e. always a complete mixing of the injected gasoline with the air introduced into the cylinder.

Generally, in order to reduce the smoke at the exhaust, gasoline injection is required to start when the piston is sufficiently far from the intake top dead centre (TDC). The particulate emissions actually essentially depend on the how much fuel accumulates on the top of the piston during fuel injection given that such amount of fuel is characterized by a lower evaporation, by a locally richer combustion and thus by a marked particulate nucleation.

On the other hand, combustion stability is guaranteed by the complete mixing of the injected gasoline with air. In an engine with gasoline direct injection having a system for variable actuation of the intake valves, gasoline is preferably injected during the intake phase given that the turbulence levels into the combustion chamber with the intake valves open are higher and thus generally facilitate the formation of a homogeneous load. Thus, the obtainment of greater repeatability of the combustion cycles increases proportionally as the time available for evaporation increases, i.e. proportional to the increase of the distance between the end of gasoline injection and the closing of the intake valve.

Obviously, the need for starting the gasoline injection sufficiently late, so as to reduce the smoke, and ending the gasoline injection sufficiently in advance with respect to the closing of the intake valve, so as to obtain complete mixing, can lead to the difficulty of guaranteeing the injection of the of the amount of gasoline required in the engine operating regimes in which the system for the variable actuation of the intake valves causes the closing of the intake valves in advance with respect to the conventional intake cycle.

OBJECT OF THE INVENTION

The object of the invention is that of overcoming such problem, by providing an engine with gasoline direct injection provided with variable actuation of the intake valves, in which—in any operating condition of the engine and in particular even when the intake valves are closed in advance— the smoke at the exhaust always remains below the maximum allowed level, the combustion is sufficiently stable due an always complete mixing, and, nevertheless gasoline is injected to each cycle at the required amount.

SUMMARY OF THE INVENTION

In order to attain such object, the invention aims at providing an engine having the characteristics that were indicated at the beginning of the present description and further characterized in that to the abovementioned electronic control means there are associated memory means in which there are memorised, according to different values of the engine rotational speed, and according to different values of the engine load:

an allowed limit value of the crank angle, before which gasoline injection cannot start, in that it would give rise to an excessive smoke at the exhaust, a minimum distance value, in terms of crank angle, which should elapse between the end of gasoline injection and the closing of the intake valve, to guarantee a homogeneous mixture of gasoline and air, said engine further being characterised in that the abovementioned electronic means are programmed for:

detecting, in any operating condition of the engine, the value of the crank angle at which the intake valve closes, controlling, in any operating condition of the engine, the end of the injection with an anticipation, with respect to the closing of the intake valve, which is equivalent to said minimum angular distance value, controlling, in any operating condition of the engine, the start of the injection substantially according to said crank angle limit value, and regulating, in any operating condition of the engine, the injection pressure to a value which is defined as a function of the injection time resulting from the abovementioned operations, to guarantee the injection of a predefined amount of gasoline.

Therefore, in the engine according to the invention, the electronic control means are capable of evaluating—in any operating condition of the engine, and thus for each value of the engine speed and for each value of the engine load—the crank angle at which injection should start and the angle at which injection should end, the latter angle corresponding to a predetermined advance with respect to the crank angle at which there occurs the closing of the intake valve. Therefore, the control means are capable of evaluating in any operating condition of the engine the period of time available for gasoline injection and they can thus determine the pressure with which the injection can be carried out so as to guarantee the injection of the required amount of gasoline.

The invention also aims at providing a method implemented in the engine of the invention, according to what is indicated in the attached claim 2.

Due to the abovementioned characteristics, the engine and the method according to the invention allow obtaining low smoke of the exhaust and a stable and uniform combustion in any operating condition of the engine, and in particular also in the operating regimes in which the system for the variable actuation of the intake valves causes an advance closing of such valves, and this without jeopardising the injection of a correct amount of gasoline.

BRIEF DESCRIPTION OF THE FIGURES

Further characteristics and advantages of the invention shall be clear from the description that follows with reference to the attached drawings, wherein.

As indicated beforehand, the present invention refers to an internal combustion engine with gasoline direct injection of the type provided with a system for the variable actuation of the intake valves capable of allowing regulating the crank angle at which the closing of the intake valves occurs. The invention is applicable regardless of the system for the variable actuation of the intake valves that is adopted. However, the present description addresses as a preferred example, the case of an engine with gasoline direct injection provided with the "MULTIAIR" system of the Applicant. Such system has the particularity of enabling regulating—independently from each other—the start and the end of the opening phase of the intake valve and also enables regulating the lift of the intake valve between a zero value and a maximum value. As illustrated in many of the Applicant's patents referring to the "MULTIAIR" system such system also aims at providing a plurality of sub-cycles for opening the intake valves which start—each time—from a zero lift value and return—each time—to a zero lift value, within the conventional intake cycle.

Figure 1:
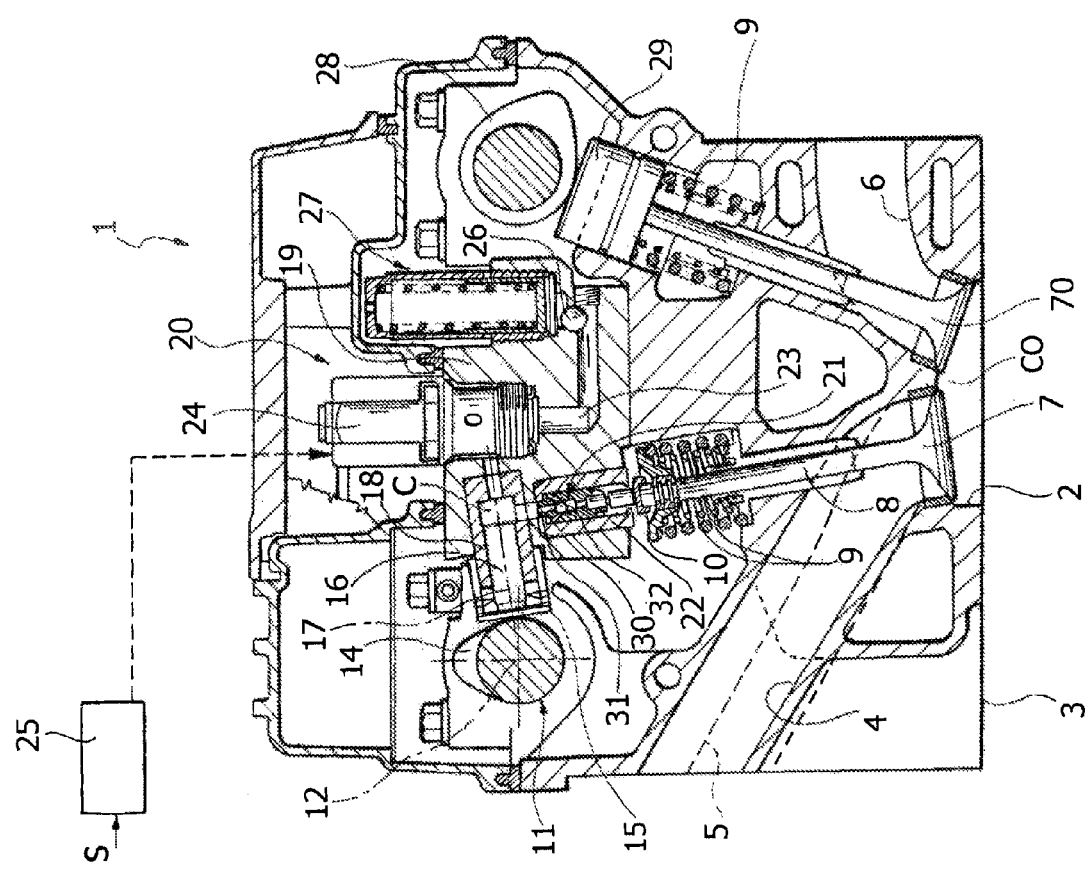
FIG. 1 is a sectional schematic view of an engine provided with "MULTIAIR" system according to the description subject of document EP 0 803 642 B1 of the Applicant.
Figure 2:
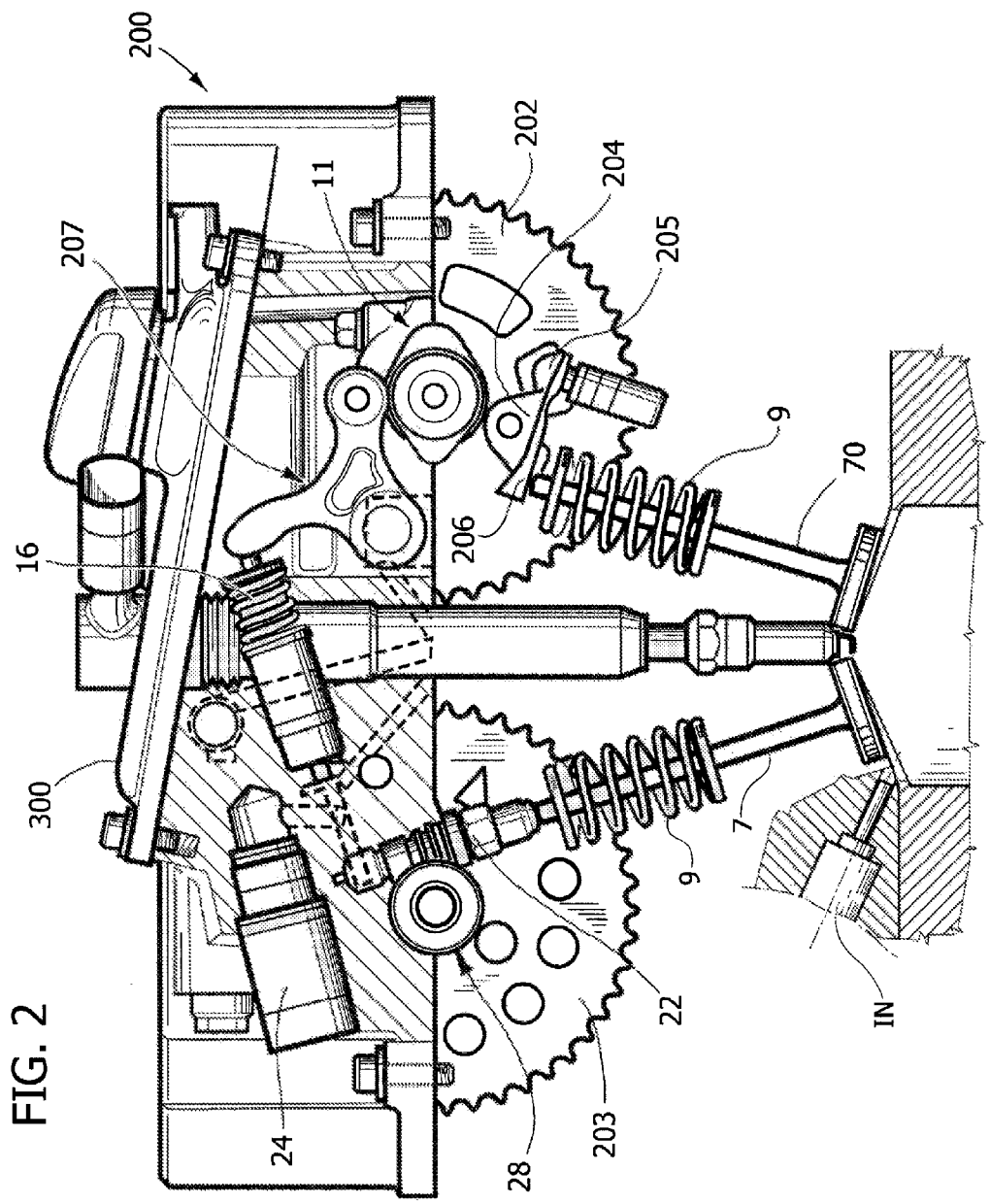
FIG. 2 is a further schematic representation showing a variant of the "MULTIAIR" system, as described in document EP 1 344 900 A2 of the Applicant.

For a better understanding of the preferred embodiment of the invention, herein provided is a description of the fundamental characteristics of the "MULTIAIR" system with reference to the attached FIGS. 1, 2.

FIG. 1 of the attached drawings shows a sectional view of an engine provided with "MULTIAIR" system, as described in the European patent EP 0 803 642 B1 of the Applicant.

With reference to such FIG. 1, the engine illustrated therein is a multi-cylinder engine, for example an engine with four in-line cylinders, comprising a cylinder head 1.

The head 1 comprises, for each cylinder, a cavity 2 formed by the base surface 3 of the head 1, defining the combustion chamber, in which the two intake conduits 4, 5 and two exhaust conduits 6 end up. The communication of the two intake conduits 4, 5 with the combustion chamber 2 is controlled by two intake valves 7, of the conventional mushroom type, each comprising a stem 8 slidably mounted in the body of the head 1.

Each valve 7 is returned towards the closed position by springs 9 interposed between an inner surface of the head 1 and an end retaining cap 10 of the valve. The communication of the two exhaust conduits 6 with the combustion chamber is controlled by two valves 70, also of the conventional type, to which springs 9 for return towards the closed position are associated.

The opening of each intake valve 7 is controlled, as described hereinafter, by a camshaft 11 rotatably mounted around an axis 12 within supports for the head 1, and comprising a plurality of cams 14 for the actuation of the intake valves 7.

Each cam 14 controlling an intake valve 7 cooperates with a plate 15 of a tappet 16 slidably mounted along an axis 17 which, in the case of the example illustrated in the mentioned prior art document, is substantially directed at 90° with respect to the axis of the valve 7. The plate 15 is returned against the cam 14 by a spring associated thereto. The tappet 16 constitutes a pumping piston slidably mounted within a bushing 18 carried by a body 19 of a preassembled assembly 20, incorporating all electrical and hydraulic devices associated to the actuation of the intake valves, according to the description outlined hereinafter.

The pumping piston 16 is capable of transmitting a thrust to the stem 8 of the valve 7, so as to cause the opening of the latter against the action of the elastic means 9, by means of pressurized fluid, preferably oil coming from the engine lubrication circuit) present in a pressure chamber C to which the pumping piston 16 is faced, and by means of a piston 21 slidably mounted in a cylindrical body constituted by a bushing 22 also carried by the body 19 of the sub-assembly 20.

Still in the solution described in FIG. 1, the pressurised fluid chamber C associated to each intake valve 7 can be placed in communication with an exhaust channel 23 through a solenoid valve 24. The solenoid valve 24, which can be of any known type adapted to the function illustrated herein, is controlled by electronic control means, indicated schematically with 25, as a function of signal S indicating the operating parameters of the engine, such as the position of the accelerator and the number of engine revolutions.

When the solenoid valve 24 is open, the chamber C enters in communication with the channel 23, hence the pressurised fluid present in the chamber C flows into such channel and thus obtaining the decoupling of the cam 14 and the decoupling of the respective tappet 16 from intake valve 7, which thus quickly returns to the closing position thereof under the action of the return springs 9. Thus, controlling the communication between the chamber C and the exhaust channel 23, allows varying the opening time and the travel of each intake valve 7 at will.

All the exhaust channels 23 of the various solenoid valves 24 end up in the same longitudinal channel 26 communicating with pressure accumulators 27, only one of which can be observed in FIG. 1.

All tappets 16 with the associated bushings 18, the pistons 21 with the associated bushings 22, the solenoid valves 24 and the respective channels 23, 26 are carried by and obtained from the abovementioned body 19 of the preassembled assembly 20, to the advantage an engine that is quick and easy to assemble.

The exhaust valves 70 associated to each cylinder are controlled, in the embodiment illustrated in FIG. 1, conventionally, by a respective camshaft 28, through respective tappets 29, even though, in the case of the mentioned prior art document, an application of the hydraulic actuation system also controlling exhaust valves cannot be excluded generally.

Still with reference to FIG. 1, the variable volume chamber defined within the bushing 22 and facing the piston 21 (which is illustrated in the minimum volume condition thereof in FIG. 1, piston 21 being in the upper end stop position thereof) communicates with the pressurised fluid chamber C through an opening 30 obtained in an end wall of the bushing 22. Such opening 30 is engaged by an end nose 31 of the piston 21 so as to provide a hydraulic braking of the movement of the valve 7 in the closing phase, when the valve is close to the closing position, in that the oil present in the variable volume chamber is forced to flow into the pressurised fluid chamber C passing through the clearance present between the end nose 31 and the opening wall 30 engaged thereby. Besides the communication constituted by the opening 30, the pressurised fluid chamber C and the variable volume chamber of the piston 21 communicate with respect to each other through internal passages obtained in the body of the piston 21 and controlled by a check valve 32 which allows the passage of fluid only from the pressurized chamber C to the variable volume chamber of the piston 21.

During the normal operation of the known engine illustrated in FIG. 1, when the solenoid valve 24 excludes the communication of the pressurised fluid chamber C with the exhaust channel 23, the oil present in such chamber transmits the movement of the pumping piston 16, imparted by the cam 14, to the piston 21 which controls the opening of the valve 7. In the initial phase of the opening movement of the valve, the fluid coming from the chamber C reaches the variable volume chamber of the piston 21 passing through the check valve 32 and further passages which place the internal cavity of the piston 21, which is tubular-shaped, in communication with the variable volume chamber. After a first displacement of the piston 21, the nose 31 exits from the opening 30, hence the fluid coming from the chamber C may pass directly into the variable volume chamber through the opening 30, now free.

In the reverse movement for closing the valve, as previously mentioned, during the final phase, the nose 31 enters into the opening 30 causing the hydraulic braking of the valve, so as to avoid impacts of the body of the valve against the seat thereof, for example after an opening of the solenoid valve 24 which causes the immediate return of the valve 7 to the closed position.

Alternatively to the hydraulic braking device illustrated in FIG. 1, the Applicant also proposes (see European patent application EP 1 344 900 A2) a different solution in which the piston 21 for controlling the intake engine valve does not have the end nose and the check valve 32 is obtained in a fixed part instead of being obtained in the body of the piston 21. Furthermore, one or more passages directly communicating with the pressure chamber C end up in the wall of the bushing within which the piston 21 is slidably mounted. Such passages are configured and positioned so that they can be progressively intercepted by the piston 21 in the final phase for closing the engine valve, with the aim of providing a narrowing of the fluid passage section, with ensuing effect of hydraulic braking. Furthermore, in the solution proposed in the European patent application EP 1 344 900 A2, an auxiliary hydraulic tappet is interposed between the piston 21 for controlling the engine valve and the stem of the engine valve.

With the aim of illustrating another relevant example of application previously proposed by the Applicant, FIG. 2 of the attached drawings shows the embodiment subject of the previous European patent application EP 1 653 057 A1 of the Applicant. In this case, the engine is provided with a single camshaft for controlling both the intake valves and the exhaust valves.

With reference to FIG. 2, all members of the electronic control hydraulic device are carried by a single brick structure 200 which has a bottom plane which—in the mounted condition—corresponds to the plane passing through the axes of two shafts 11, 28. The shaft 11 is the sole camshaft of the engine and it is thus provided both with cams for controlling the intake valves and with cams for controlling the exhaust valves of the engine, while the shaft 28 is a camless shaft having an end protruding from the cylinder head carrying a power take-off which can be used for actuating any auxiliary system.

Analogously to the conventional engine, the two shafts 11, 28 have ends also outside the cylinder head carrying gears 202, 203 intended to mesh with the transmission chain which transmits motion from the drive shaft to the shafts 11, 28.

The shaft 11, as mentioned previously, is provided both with cams for actuating the intake valves of the engine and with cams for actuating the exhaust valves. According to a solution already proposed in the previous European patent application EP 1 555 398 A1 of the Applicant, the cams for controlling the intake valves control the latter by means of an electronic control hydraulic device of the type analogous to the one described with reference to FIG. 1. In FIG. 2, the parts of such device are indicated using the same reference numbers that were used in FIG. 1. Vice versa, the exhaust valves are mechanically controlled by the respective cams of the shaft 11. As clearly observable in FIG. 2, the exhaust valves are controlled through rocker arms 204 each of which has an end 205 pivoted to the structure of the cylinder head, an intermediate roller for contact with the respective cam, and the opposite end 206 which controls the respective exhaust valve 70. The pumping element 16 associated to each intake valve is instead controlled by a rocker arm 207 which is pivoted to the structure of the brick 200 and which has portions for engagement respectively with the control cam carried by the shaft 11 and with the pumping element 16. FIG. 2 also illustrates a spark plug 208 (and the relative coil 209) associated to the engine cylinder. As previously mentioned, the "brick" carries all the elements part of the electronic control hydraulic device for the variable actuation of the intake valves 7, as well as all the channels of the hydraulic system associated to such device.

An injector IN for the direct injection of gasoline into the combustion chamber, according to what is provided for in the present invention is also schematically illustrated in FIG. 2.

The present description and the attached drawings do not show the construction details and the operation of the gasoline injectors and the gasoline supply system associated thereto, given that they can be provided in any known manner and they do not fall, considered independently, within the scope of the invention. The injectors receive gasoline from a rail which is supplied by an injection pump of any known type. Also according to the prior art, the electronic control unit is capable of controlling the pump assembly to obtain a pressure variation in the rail and hence a pressure variation with which the gasoline is injected into the cylinders by the injectors IN. Still according to the prior art, the possibility of varying the injection pressure is for example obtained by providing a check valve controlled by a solenoid valve of the on/off type at the inlet of the injection pump.

Figure 3:
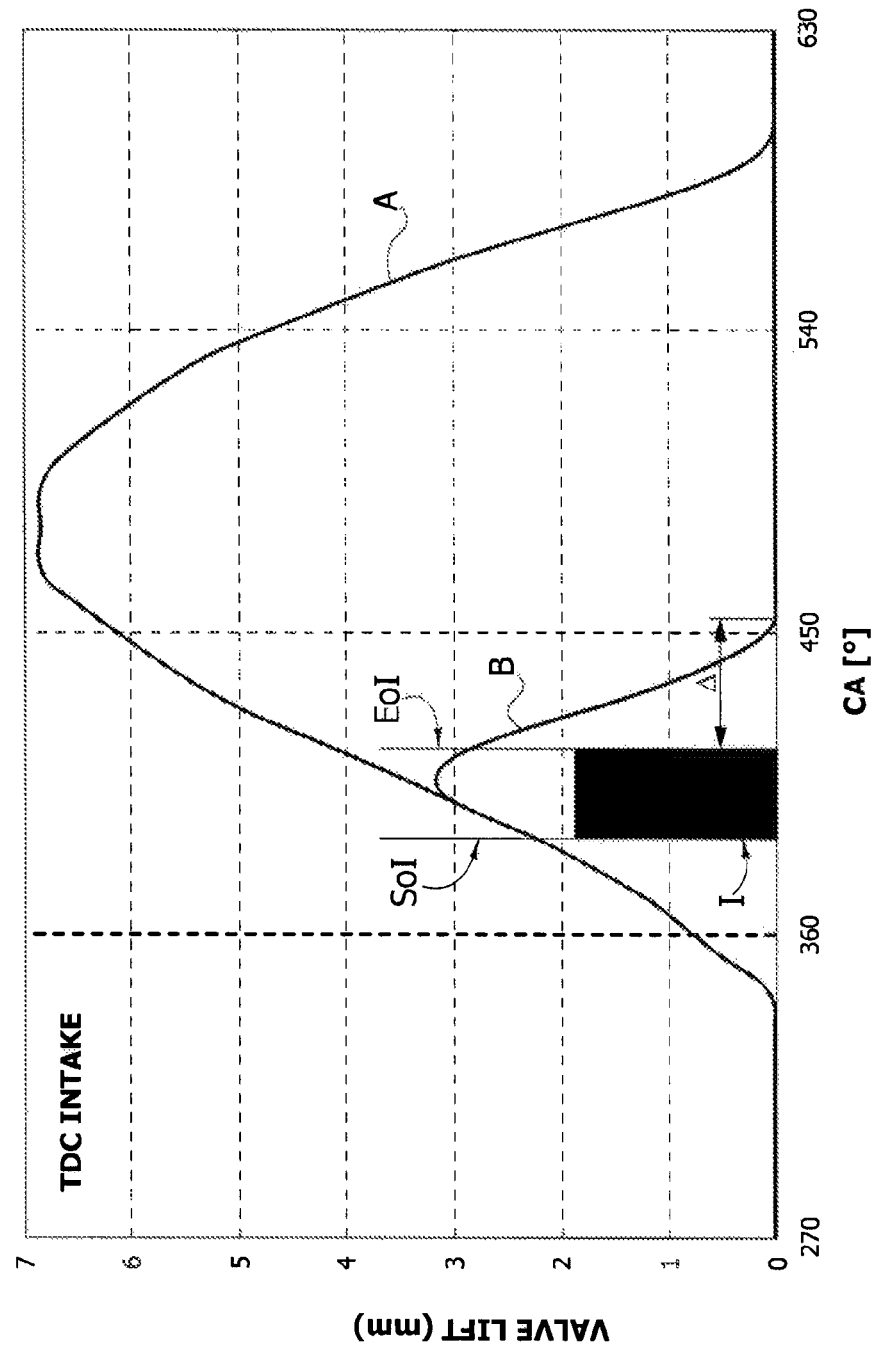
FIG. 3 is a diagram illustrating the lift cycle of an intake valve and the cycle for injecting gasoline into an engine according to the invention.

Now, considering the problem on which the present invention is based, FIG. 3 of the attached drawings shows the conventional lift profile of the intake valve with a line marked with A. In the illustrated case, the intake valve opens slightly before the intake top dead centre (corresponding in FIG. 3 to the 360° value of the crank angle) reaches the maximum value thereof defined by the profile of the actuation cam, and it closes at a crank angle of about 590°. In the case of an engine provided with the "MULTIAIR" system, such system, in given operating regimes of the engine closes the intake valve in advance to obtain a series of operating advantages, among which a reduction of consumptions. Thus, for example, in a given operating condition of the engine the lift diagram of the intake valve becomes the one indicated by letter B in FIG. 3. In the case of the diagram B, the intake valve opens at the same instant of the diagram A, but it closes considerably in advance with respect to the conventional cycle A, for example around a crank angle near 450°. In the specific case, such operating condition corresponds to an engine rotational speed equivalent to 3000 rpm and an engine corresponding to 5 bars of the mean effective pressure (PME).

Still in FIG. 3, the area I indicates the phase of injecting gasoline, which starts at an angle SoI and ends at an angle EoI.

As previously indicated, should the start of injection SoI be too close to the intake TDC, i.e. should the injection start when the piston is not yet sufficiently far from the TDC, there occurs excessive smoke at the exhaust, due to the previously described phenomena.

At the same time, should the distance Δ, in terms of crank angle, between the end of the injection and the closing of the intake valve in the cycle B be insufficient, the combustion occurs without sufficient mixing of the gasoline with air, hence leading to a non-homogeneous load and an insufficient uniformity of the engine combustion cycles over time.

Figure 4:
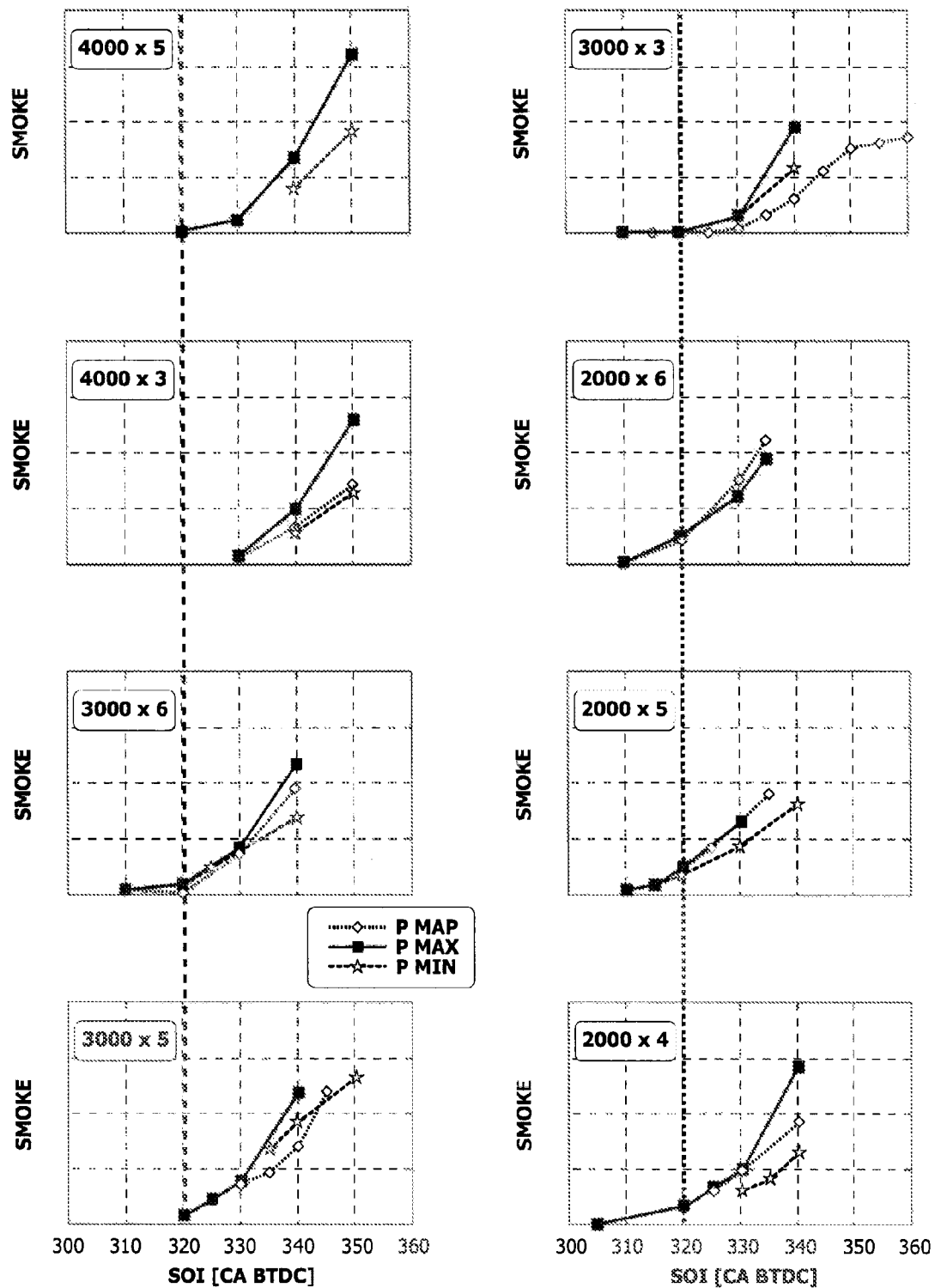
FIG. 4 illustrates a series of diagrams obtained by way of experiment showing, according to different points of operation of the engine and according to different gasoline injection pressure values, the variation of the smoke at the exhaust as a function of the crank angle at which gasoline injection starts.
Figure 5:
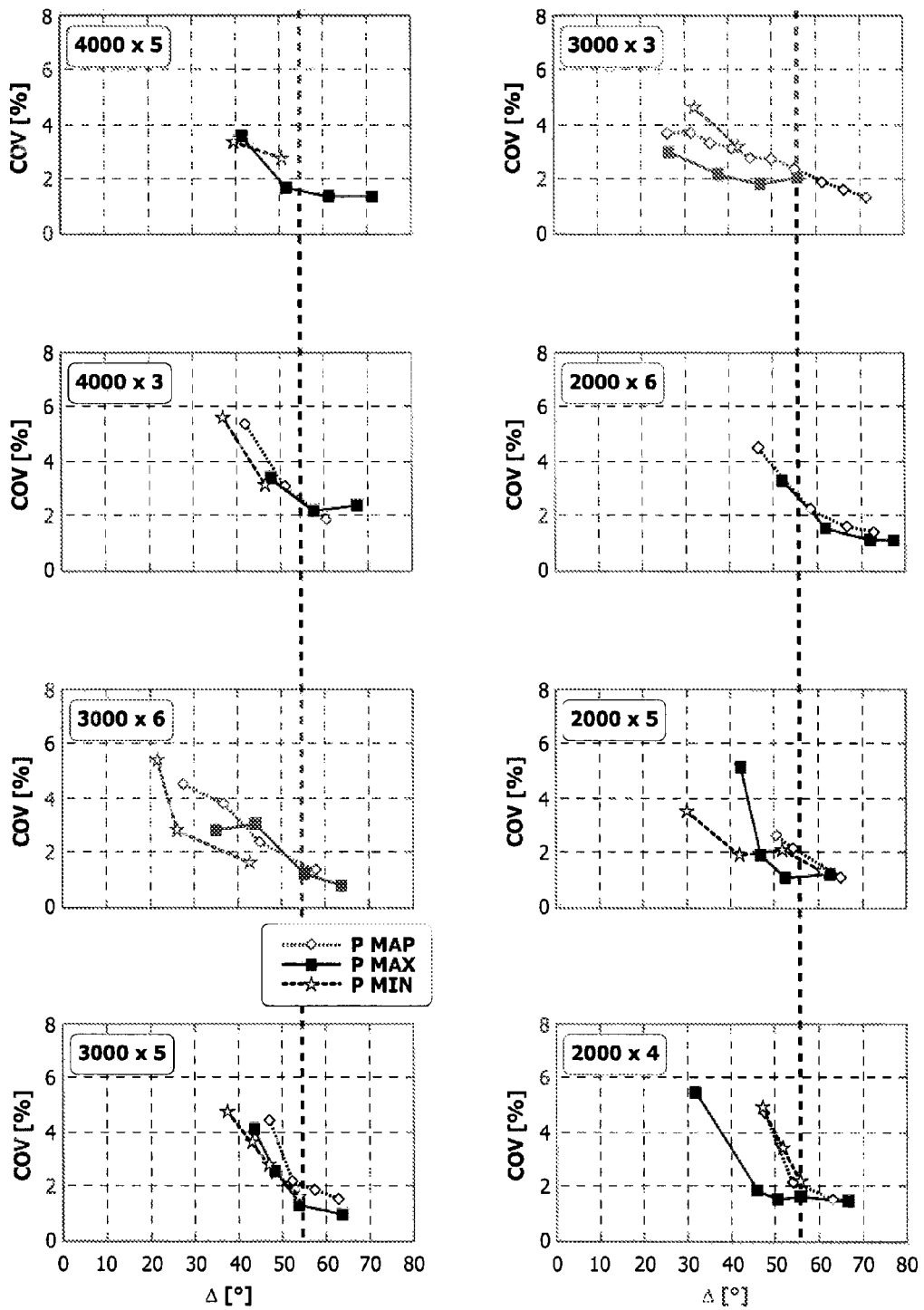
FIG. 5 illustrates a series of diagrams obtained by way of experiment, showing, according to different points of operation of the engine and according to different gasoline injection pressure values, the variation of a combustion stability index as a function of the distance in terms of crank angle between the end of gasoline injection and the closing of the intake valve.

The effects described above are clear from an analysis of the diagrams of FIGS. 4, 5 of the attached drawings. FIG. 4 shows different diagrams each corresponding to a given point of operation of the engine, identified with a value of the engine rotational speed and a value of the engine load, defined as the value—in bars—of the mean effective pressure (PME) in the cylinder. Therefore, the indications 4000×5, 4000×3, 3000×6, etc indicate points of operation of the engine corresponding to an engine rotational speed of 4000 rpm with 5 bars of PME, 4000 rpm with 3 bars of PME, 3000 rpm with 6 bars of PME, etc. Each diagram also shows different lines, corresponding to different values of the injection pressure, specifically 50 bars (PMIN), 80-100 bars (PMAP) and 150 bars (PMAX). Each line in each diagram of FIG. 4 shows the value of the smoke index (FSN) according to different values of the crank angle corresponding to the start of gasoline injection. However, it should be observed that in the diagrams of FIG. 4 the crank angles are presented as angles before the ignition top dead centre, hence the increasing values of the indicated angle correspond to an increasing advance of the start of gasoline injection. As clearly observable from FIG. 4, for all the analysed conditions of operation, the smoke at the exhaust quickly exceeds the 1 FSN threshold should the start of injection (SoI) limit value, substantially equivalent to 320° before the ignition TDC be exceeded. Such limit value corresponds to the angle due to which the interaction between the gasoline jet and the wall of the piston leads to an excessive smoke. Considering the same angular velocity, the critical angle decreases as the load increases given that the amount of gasoline injected on the wall is increased. The critical angle increases as the angular velocity increases due to the fact that the piston quickly moves away from the gasoline jet and collects less gasoline.

FIG. 5 shows, analogously to FIG. 4, different diagrams corresponding to different points of operation of the engine and according to different values of the injection pressure. The diagrams of FIG. 5 show the value of the Coefficient of Variation (CoV) of the mean indicated pressure (PMI) as a function of the distance, in terms of crank angle, between the end of the injection electrical signal and the mechanical closing of the intake valves (Δ). It should be observed that there is a critical value of the abovementioned angular distance for maintaining the CoV index value below 3%, such angular distance critical value being equivalent to 55°.

Figure 6:
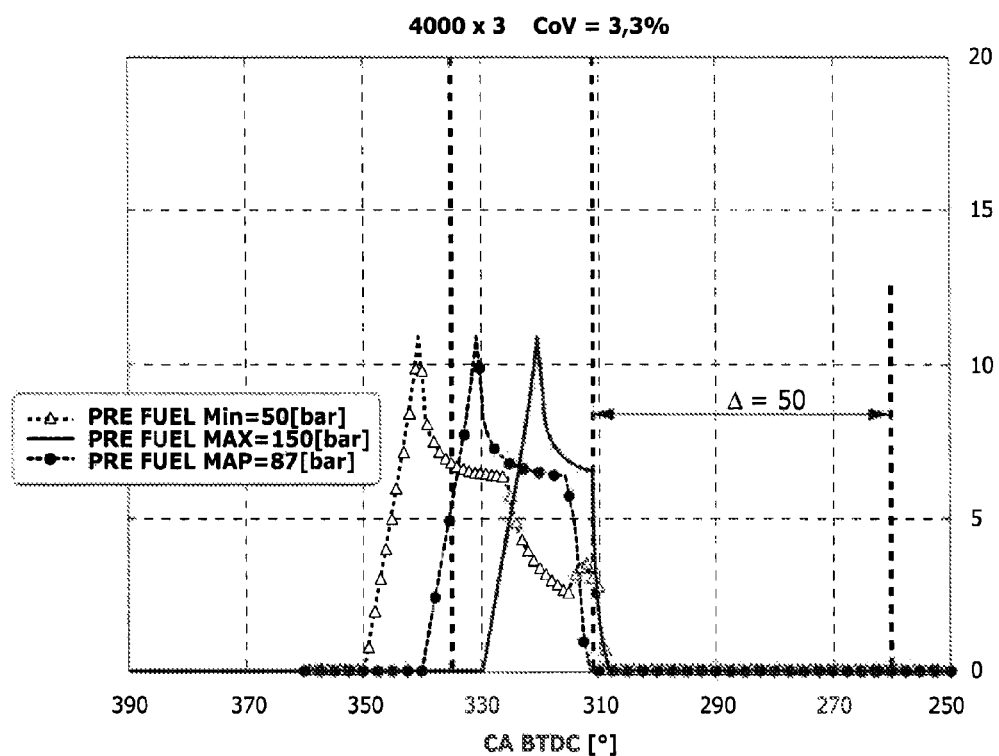
FIG. 6 illustrates a diagram, referring to a defined point of operation of the engine, and showing the electrical signals corresponding to three different gasoline injection cycles which differ from each other both according to the angle at which gasoline injection starts and according to the injection pressure, the angle corresponding to the end of the injection being substantially identical in the three cases.

FIG. 6 shows electrical signals of three injections made with three different injection pressure values at the point of operation 4000×3 with CoV equivalent to about 3.3%. The diagram of FIG. 6 shows that the three injection cycles always end at the same crank angle, i.e. at the same angular distance with respect to the subsequent closing of the intake valve, while the injection start points are different. The injection pressure increases as the duration of the injection reduces so as to guarantee the injection of the required amount of gasoline.

Figure 7:
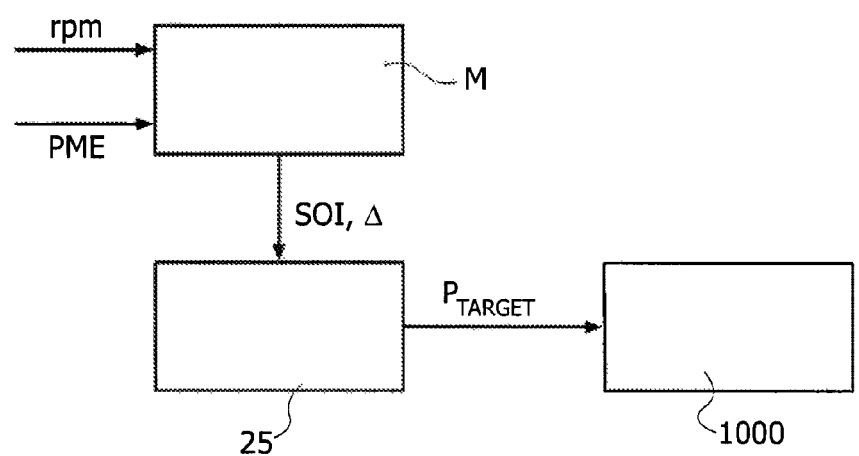
FIG. 7 is a block diagram illustrating the basic principles of the method of the invention.

With reference to FIG. 7, to the electronic control means provided for in the engine according to the invention, indicated with 25, there are associated memory means M in which there are memorised, according to different values of the engine rotational speed and according to different values of the engine load, an allowed limit value before which gasoline injection cannot start, in that it would give rise to an excessive smoke at the exhaust, and a minimum allowed value of the distance Δ, in terms of crank angle, which should elapse between the end of gasoline injection and the closing of the intake valve. Therefore, in any operating condition of the engine, the electronic control means 25 are adapted to acquire from the memory means M, according to the rpm value of the engine speed and the value of the engine load (PME) the abovementioned limit value for the start of gasoline injection and the abovementioned minimum distance (Δ) which should separate the end of gasoline injection from the closing of, the engine valve. According to the invention, the abovementioned limit value is taken as the value of crank angle at which gasoline injection should start and the abovementioned distance Δ is taken so as to define the end of gasoline injection.

The electronic control means 25 are thus capable, according to the injection start and end angles, of calculating the time available for the injection and hence calculating an injection pressure target value ($P_{target}$) which is used for controlling an injection pump 1000 so as to obtain, in the rail for supplying the injectors, the calculated injection pressure. According to the known art, the possibility of varying the injection pressure is for example obtained by providing a check valve controlled by a solenoid valve of the on/off type at the injection pump inlet. As previously indicated, the means for obtaining the variation of the injection pressure are not illustrated herein in detail, in that per se known, and in that they, considered independently, do not fall within the scope of the invention.

Should the calculated value of the injection pressure exceed the maximum obtainable value, the injection is carried out at such maximum pressure value.

The specific algorithm for calculating the injection pressure is illustrated below.

Required Amount of Fuel $$QFUELOBJ = A_{eq} * \sqrt{2\rho\Delta p} \Delta t;$$

Target Injection Time Definition to Obtain SMOKE<1 [FSN] & COVIMEP<3[%]

$$\Delta t = \frac{QFUELOBJ}{A_{eq} * \sqrt{2\rho\Delta p}};$$

$$\Delta t_{TARGET} = \left[ SoI\_Cr - \left( \begin{array}{c} ANGVVAEC + \\ EOI\_MechDistance\ Cr \end{array} \right) \right] * (RPM*6)^{-1}$$

$$\Delta t_{TARGET} = \frac{QFUELOBJ}{A_{eq} * \sqrt{2\rho\Delta p_{TARGET}}};$$

Target Injection Pressure Definition to Obtain SMOKE<1 [FSN] and CoV<3[%]

$$\Delta p_{TARGET} \cong PREFUEL_{TARGET} = \frac{QFUELOBJ^2}{A_{eq}^2 * 2\rho * \Delta t_{TARGET}^2}$$

$$\forall\ PREFUEL_{TARET} > PREFUEL_{MAX};$$

$$PREFUEL_{TARGETOBJ} = PREFUEL\_MAX$$

Through this algorithm, the injection pressure always remains defined and equivalent to the minimum value possible so as to minimise the frictions of the pump and meet the requirements regarding the particulate and the CoV.

In the case where $PREFUEL_{TARGET} > PREFUEL_{MAX}$ the value is saturated but the SoI remains unvaried without altering the particulate emissions which could lead to clogging the intake valves due to excessive impurities of carbon nature.

In the formulae above, the symbols have the following meaning.

PMI=Mean indicated pressure [bars]
PME=Mean effective pressure [bars]
QFUELOBJ=Amount of fuel per cycle [kg]
Δt=Injection time [s]
Δp=Pressure variation astride the nozzle [Pa]
$A_{eq}$=Equivalent flow area [m$^2$]
ρ=Fuel density [kg/m$^3$]
PREFUEL=Injection pressure [Pa]
SoI_Cr=Start of Injection critical for the emission of particulate [deg BTDC]
EOI_MechDistance Cr=Critical distance between the end of the injection and the closing of the intake valves [°]
ANGVVAEC=Mechanical closing angle of the intake valves [deg BTDC]
RPM=Engine revolution speed [rpm]

As clear from the description above, the engine and the method according to the invention allow regulating, in a simple and reliable manner, the injection pressure in the various engine operating conditions, considering the variation of the crank angle at which the intake valves close to guarantee in each case a low smoke at the exhaust and a combustion stability. As previously indicated, the invention is applicable to an engine with gasoline direct injection provided with any type of system for the variable actuation of the valves but obviously the preferred embodiment is the one that provides for the "MULTIAIR" system of the Applicant.

Obviously, without prejudice to the principle of the invention, the construction details and the embodiments may widely vary with respect to what has been described and illustrated purely by way of example, without departing from the scope of protection of the present invention.

What is claimed is:

1. Internal combustion engine, with gasoline direct injection, comprising, for each cylinder:
   a combustion chamber,
   at least one intake conduit and at least one exhaust conduit ending up in said combustion chamber,
   an intake valve and an exhaust valve associated to said intake and exhaust conduits,
   means for actuating the intake valve adapted to vary a closing instant of the intake valve at an end of an intake phase,
   means for injecting gasoline into said combustion chamber during said intake phase and adapted to vary the injection time, and electronic control means for controlling said means for actuating the intake valve and said injection means, wherein to said electronic control means there are associated memory means in which there are memorized, according to different values of the engine rotational speed and according to different values of the engine load:

an allowed crank angle before which gasoline injection cannot start without causing an excessive amount of smoke in an exhaust from the chamber into one of the exhaust conduits, said electronic control means programmed for:
controlling, in any operating condition of the engine, the start of the injection substantially at said allowed crank angle, said means for injecting gasoline adapted to vary the injection pressure, in said memory means there is also memorized, according to different values of the engine rotational speed and according to different values of the engine load, a minimum crank angle, which should elapse between the end of gasoline injection and the closing of the intake valve, to guarantee a homogeneous mixture of gasoline and air, said electronic means being programmed for:
detecting, in any operating condition of the engine, a value of a closing crank angle at which the intake valve is closed,
controlling, in any operating condition of the engine, the end of the injection with an anticipation, with respect to the closing of the intake valve, which is equivalent to said minimum crank angle, and
regulating, in any operating condition of the engine, the injection pressure to a value which is defined as a function of the injection time resulting from the abovementioned operations, to guarantee the injection of a predefined amount of gasoline.

2. Engine according to claim 1, wherein:
each intake valve is provided with respective return spring means which push the intake valve towards a closed position, and in that
said engine comprises at least one camshaft for actuating the intake valves, by means of respective tappets,
wherein each intake valve is controlled by the respective tappet against the action of the abovementioned return spring means by interposing hydraulic means including a pressurised fluid chamber which is faced by a pumping piston connected to the tappet of the intake valve,
said pressurised fluid chamber being adapted to be connected by means of a solenoid valve with an exhaust channel, with the aim of decoupling the variable actuation valve from the respective tappet and cause the quick closing of the intake valve due to the respective elastic return means, said electronic control means being adapted to control each solenoid valve so as to vary the opening and the closing of the intake valve, as well as the lift of the intake valve, as a function of one or more engine operating parameters.

3. Method for controlling the timing and the injection pressure of gasoline into a controlled ignition internal combustion engine, the method comprising the engine comprising, for each cylinder:
a combustion chamber,
at least one intake conduit and at least one exhaust conduit ending up in said combustion chamber,
an intake valve and an exhaust valve associated to said intake and exhaust conduits,
means for actuating the intake valve, adapted to vary a closing instant of the intake valve at an end of an intake phase,
means for injecting gasoline into said combustion chamber during said intake phase, adapted to vary the injection time, and
electronic control means for controlling said means for actuating the intake valve and said injection means, memorizing according to different values of the engine rotational speed and according to different values of the engine load:
an allowed crank angle before which gasoline injection cannot start without causing an excessive amount of smoke from the chamber in an exhaust into one of the exhaust conduits,
controlling, in any operating condition of the engine, the start of the injection substantially at said crank angle limit value,
memorizing, according to different values of the engine rotational speed and according to different values of the engine load, a minimum distance value, in terms of crank angle, which should elapse between the end of gasoline injection and the closing of the intake valve, to guarantee a homogeneous mixture of gasoline and air,
detecting, in any operating condition of the engine, the value of the crank angle at which the intake valve is closed,
controlling, in any operating condition of the engine, the end of the injection with an anticipation, with respect to the closing of the intake valve, which is equivalent to said minimum distance value,
regulating, in any operating condition of the engine, the injection pressure by the means for injecting gasoline to a value which is defined as a function of the injection time resulting from the abovementioned operations, to guarantee the injection of a predefined amount of gasoline.

* * * * *

UNITED STATES PATENT AND TRADEMARK OFFICE
CERTIFICATE OF CORRECTION

| | |
|---|---|
| PATENT NO. | : 8,857,406 B2 |
| APPLICATION NO. | : 13/305367 |
| DATED | : October 14, 2014 |
| INVENTOR(S) | : Borean et al. |

It is certified that error appears in the above-identified patent and that said Letters Patent is hereby corrected as shown below:

Title page, in the Foreign Application Priority Data item (30): Delete "111154952" and insert --11154952--

Signed and Sealed this
Twentieth Day of January, 2015

Michelle K. Lee
*Deputy Director of the United States Patent and Trademark Office*